United States Patent [19]

Brezinsky

[11] 4,449,014
[45] May 15, 1984

[54] PLASTIC/METAL LAMINATES, CABLE SHIELDING OR ARMORING TAPES, AND ELECTRICAL CABLES MADE THEREWITH

[75] Inventor: Richard H. Brezinsky, Newark, Ohio

[73] Assignee: The Dow Chemical Company, Midland, Mich.

[21] Appl. No.: 406,661

[22] Filed: Aug. 9, 1982

Related U.S. Application Data

[63] Continuation-in-part of Ser. No. 225,946, Jan. 19, 1981, abandoned.

[51] Int. Cl.³ .................... B32B 15/08; H01B 7/18; H01B 7/22
[52] U.S. Cl. .................... 174/107; 428/334; 428/335; 428/336; 428/349; 428/377; 428/383; 428/461
[58] Field of Search .......... 428/379, 377, 383, 220, 428/461, 334, 335, 336, 343, 349; 174/107

[56] References Cited

U.S. PATENT DOCUMENTS 3,891,791  6/1975  Schmidt .................. 174/107
4,092,452  5/1978  Hori et al. ............. 428/461 X
4,125,739 11/1978  Bow ....................... 174/36
4,292,463  9/1981  Bow et al. ............. 174/107
4,322,574  3/1982  Bow et al. ............. 174/107

Primary Examiner—Lorraine T. Kendell
Attorney, Agent, or Firm—J. B. Guffey; D. R. Howard

[57] ABSTRACT

Plastic/metal laminates (such as, for example, plastic coated cable shielding or armoring tapes) having improved high and/or low temperature adhesion to various olefin polymer substrates (such as, for example, cable jacketing resins) are provided which comprise at least one metallic substrate having directly adhered to at least one surface thereof a first thermoplastic polymer layer of a random copolymer of ethylene with an ethylenically unsaturated carboxylic acid monomer and having adhered to said first polymer layer a second thermoplastic polymer layer comprising a polymer blend of (a) either the same or a different random copolymer of ethylene with an ethylenically unsaturated carboxylic acid as used in said first polymer layer and (b) at least one different ethylenic olefin polymer resin which is not a random ethylene/unsaturated carboxylic acid copolymer.

20 Claims, No Drawings

PLASTIC/METAL LAMINATES, CABLE SHIELDING OR ARMORING TAPES, AND ELECTRICAL CABLES MADE THEREWITH

CROSS-REFERENCE TO RELATED APPLICATIONS

This application is a continuation-in-part of application Ser. No. 225,946, which was filed Jan. 19, 1981, and now abandoned.

BACKGROUND OF THE INVENTION

This invention relates in a general aspect to plas in which at least one polymer layer in direct contact with the metallic substrate (a) comprises a random copolymer of ethylene and an ethylenically unsaturated carboxylic acid and (b) bears on its surface opposite said metallic substrate a layer of a blend of either the same or a different random ethylene/ethylenically unsaturated carboxylic acid copolymer and at least one olefin polymer resin which is not a random ethylene/ethylenically unsaturated carboxylic acid copolymer and (II) to cable shielding and/or armoring tapes and electrical communications cables prepared from such laminates.

In the manufacture and use of various laminated or composite articles involving one or more metallic layers or substrates having one or more layers or coatings of a thermoplastic polymer material adhered thereto, an oftentimes controlling factor or consideration governing their suitability for various end-use applications is the degree of adhesion as between the various polymeric and metallic layers in such laminated or composite articles. A particular example of an area in which the adhesion between the various layers in a plastic/metal composite article is of great concern can be found in U.S. Pat. No. 4,132,857 wherein the need for improved adhesion as between the polyethylene insulation jacketing material and the metal sheath in electrical cable constructions is discussed. More specifically, such patent proposes to improve the adhesion between said polyethylene jacketing material and said metal sheath by using, in place of the more conventionally employed ethylene/acrylic or methacrylic acid copolymer adhesive layer, a coextruded dual film laminate comprising (1) a first film that the above-discussed approach of U.S. Pat. No. 4,132,857 may be capable of providing some measure of improved jacketing resin adhesion in certain instances when measured at room temperature, such an improvement in room temperature adhesion performance does not appear to be consistently achieved across the full range of possible jacketing resin/second film layer combinations. (See, for example, the data summarized in the hereinafter presented working examples.) Moreover, it has also been found that even when good room temperature jacketing resin adhesion is obtained (e.g., either by the above-discussed dual film layer approach of U.S. Pat. No. 4,132,857 or via a monolayer ethylene/acrylic or methyacrylic acid copolymer-coated metal shielding tape approach), such adhesion value can often times be dramatically less when measured at high and/or low adhesion testing temperatures.

In view of the fact that various plastic/metal composite articles or laminates can reasonably be expected to be installed and/or otherwise used (e.g., as electrical communications cables; as metal/plastic/metal laminates for potential use as electrical appliance housings, in heating ducts, in various automotive applications, etc.) at temperatures substantially above or below normal room temperature (e.g., 20°–25° C.), it would be highly desirable to provide a means of improving the high and/or low temperature adhesion as between metal substrates and olefin polymer outer coating or inner core layers in such plastic/metal composite articles or laminates.

SUMMARY OF THE INVENTION

In accordance with the present invention, such improved high and/or low temperature adhesion is provided between an olefin polymer layer and a metallic layer in a plastic/metal composite article by using therein a multiple layered thermoplastic adhesive system comprising a first thermoplastic polymer layer of a random copolymer of ethylene with an ethylenically unsaturated carboxylic acid monomer and a second thermoplastic polymer layer comprising a polymer blend of a random copolymer of ethylene with an ethylenically unsaturated carboxylic acid monomer and at least one different olefin polymer resin which is not a random copolymer of ethylene with an ethylenically unsaturated carboxylic acid monomer.

Thus, in one aspect, the present invention takes the form of a layered plastic/metal composite article (e.g., a plastic/metal laminate, a plastic/metal/plastic laminate, or a metal/plastic/metal laminate, such as are used as cable shielding and/or armoring tapes, etc.) comprising at least one metallic substrate having directly adhered to at least one side thereof a first thermoplastic polymer layer of a random copolymer of ethylene with an ethylenically unsaturated carboxylic acid monomer and having adhered to said first polymer layer, on the surface of such polymer layer opposite said metallic substrate, a second thermoplastic polymer layer comprising a polymer blend of a random copolymer of ethylene with an ethylenically unsaturated carboxylic acid monomer and at least one different olefin polymer resin which is not a random copolymer of ethylene with an ethylenically unsaturated carboxylic acid monomer.

In a related aspect, the present invention takes the form of a layered plastic/metal composite article comprising at least one metallic substrate having directly adhered to one side thereof the multiple layered thermoplastic adhesive system and to a second side thereof a single layer coating of a random copolymer of ethylene with a minor proportion of an ethylenically unsaturated carboxylic acid. The multiple layered thermoplastic adhesive system is oriented so that the first thermoplastic polymer layer thereof is directly adhered to the metallic substrate. The multiple layered thermoplastic adhesive system and the single layer coating each have a thickness in the range of from about 0.1 to about 5 mils.

Further, in another aspect, the present invention takes the form of a more finished plastic/metal composite article such as, for example, an electrical cable, a formable and/or structural metal/plastic/metal laminate, etc., which further comprises at least one olefin polymer layer (e.g., such as a central core layer in said metal/plastic/metal laminate or as an outer insulating jacketing resin layer in said electrical cable) which is directly adhered to a layer of the aforementioned polymer blend. Thus, in one of these latter instances, an electrical cable is provided having improved high and/or low temperature structural integrity which comprises (1) a core including at least one insulated conductor; (2) a shield or armor surrounding said core, said shield or armor being composed of a cable shielding or armoring tape comprising a metal strip having directly adhered to at least one surface thereof a random copolymer of ethylene with an ethylenically unsaturated carboxylic acid and having adhered to said random copolymer layer a polymer blend layer of a random copolymer of ethylene and an ethylenically unsaturated carboxylic acid with at least one other olefin polymer which is not a random copolymer of ethylene with an ethylenically unsaturated carboxylic acid monomer; and (3) an outer plastic jacketing resin surrounding said cable shielding or armoring tape and being directly adhered to the indicated polymer blend layer of said cable shielding or armoring tape.

Similarly, in another of these latter instances, a metal/plastic/metal laminate is provided which also has improved high and/or low temperature structural integrity, said laminate comprising two metallic sheets or substrates sandwiching an inner olefin polymer core layer and having interposed between each of the two major surfaces of the core layer and the adjacent metallic substrates a layer of the hereinbefore described multiple layered thermoplastic adhesive with the polymer blend layer of each of said adhesive layers being directly adhered to said olefin polymer core layer and with the random ethylene/ethylenically unsaturated carboxylic acid copolymer layer of each of said adhesive layers being directly adhered to its corresponding adjacent metallic substrate.

As used herein, "low temperature structural integrity or adhesion" is evaluated by measuring the 90° peel strength of the laminate of concern at a testing temperature of 10° F. and pursuant to the modified ASTM 1876 procedure described hereinafter in conjunction with Example 1 hereof. Similarly, "high temperature structural integrity or adhesion" is determined by measuring, pursuant to the same modified ASTM procedure, the 90° peel strength at a testing temperature of 160° F.

Further, it should be understood that when "random copolymers of ethylene with an ethylenically unsaturated carboxylic acid" are referred to it is intended to include therewith the known partially or fully neutralized versions thereof which are commonly referred to in the art as "ionomers".

In addition, it should also be understood that, when improved high and/or low temperature adhesion or structural integrity is referred to herein, it is meant that the high and/or low temperature adhesion between the olefin polymer core or surface layer or layers and the metal substrate or substrates of the metal/olefin polymer laminate or composite article involved is improved by virtue of the use of the above-described multilayered adhesive system (a) relative to corresponding adhesion provided by the use of a single layer of the random ethylene/carboxylic acid copolymer as the adhesive therein and (b) relative to the use of a two layered adhesive system (e.g., a coextruded two layer film) having the random ethylene/carboxylic acid copolymer as the metal substrate-contacting layer and a layer composed solely of the different olefin polymer component of the blend layer (i.e., which is not a random ethylene/carboxylic acid copolymer) contacting the olefin polymer substrate of the laminate or composite involved.

DETAILED DESCRIPTION OF THE INVENTION

Plastic/metal laminates or composite articles to which the present invention is applicable include any such laminate or article in which it is desired to adhere one or more metal sheets or substrates to one or more layers or substrates of an olefin polymer which does not typically exhibit very good high and/or low temperature adhesion to such a metallic sheet or substrate. Thus, the present invention is applicable where it is desired to adhere such an olefin polymer as an outer coating layer on one or both sides of a single metal sheet or substrate such as, for example, in the case of a cable shielding and/or armoring tape per se or in the case of an olefin polymer jacketed electrical communications cable utilizing one or more metallic shields or armors formed from such a cable shielding tape as well as in the case of other olefin polymer coated metal materials, such as are used, for example, in flexible packaging applications, coated structural or building panel applications and the like. Similarily, the present invention is also applicable where it is desired to adhere two or more metal sheets or substrates to a common olefin polymer sheet, substrate or core layer such as, for example, in the case of structural or formable metal/plastic/metal composite articles or laminates having a central core layer of the aforementioned type of olefin polymer adhesively bonded to, and sandwiched between, two outer metallic sheets or skins.

As has been previously indicated, the present invention broadly encompasses plastic/metal laminates or composite articles in which the adhesion of a metal substrate to an olefin polymer core or coating layer at either low (i.e., 10° F.) or high (i.e., 160° F.) temperature is notably enhanced by the use of the aforementioned type of multiple layered thermoplastic adhesive system in place of either (a) a single layer of the random ethylene/unsaturated carboxylic acid copolymer itself (i.e., the polymer of the metal-contacting adhesive layer) or (b) a comparable two layered adhesive system in which the second polymer layer thereof does not contain any significant proportion of a random ethylene/ethylenically unsaturated carboxylic acid copolymer therein.

In preferred embodiments of the present invention, the plastic/metal laminates or composite articles provided exhibit the above-described adhesion enhancement phenomenon at both 10° F. and 160° F. testing temperatures. Moreover, in the case of certain preferred embodiments, the actual adhesion value provided between the olefin polymer core or coating layer or layers and the metal layer or layers is at least about 5 (preferably at least about 7 and most preferably at least about 10) pounds per inch regardless of whether the hereinafter described modified ASTM 1876 adhesion testing procedure is conducted at a testing temperature of 10° F., normal room temperature or 140° F. Furthermore, in the case of certain especially preferred embodiments, said actual adhesion value is at least about 5 (preferably at least about 7 and most preferably at least about 10) pounds per inch even when determined at 160° F. pursuant to the indicated modified ASTM adhesion testing procedure.

The metallic substrate (e.g., sheets, strips, etc.) employed in the practice of the present invention will typically have a thickness of from about 2 to about 25 mils (more preferably from about 4 to about 15 mils) and can be composed of a wide variety of metallic materials such as, for example, aluminum, aluminum alloys, allow-clad aluminum, copper, surface modified copper, bronze, steel, tin free steel, tin plate steel, aluminized steel, aluminum-clad steel, stainless steel, copper-clad stainless steel, copper-clad low carbon steel, terne-plate steel, galvanized steel, chrome plated or chrome treated steel, lead, magnesium, tin and the like. Such metals can, of course, be surface treated or have conversion coatings on the surface thereof if desired.

Particularly preferred metallic substrates for use herein include those composed of chrome/chrome oxide coated steel (also commonly referred to in the art as tin-free steel), stainless steel, aluminum and copper.

Thermoplastic polymers suitable for use as the metal-contacting layer in the practice of the present invention include the known normally solid random copolymers of a major proportion of ethylene with a minor proportion (e.g., typically from about 1 to about 30, preferably from about 2 to about 20, percent by weight based upon the weight of such copolymer) of an ethylenically unsaturated carboxylic acid monomer. Specific examples of such suitable ethylenically unsaturated carboxylic acids (which term includes mono-and polybasic acids, acid anhydrides, and partial esters of polybasic acids, as well as the various metallic salts thereof) are acrylic acid, methacrylic acid, crotonic acid, fumaric acid, maleic acid, itaconic acid, maleic anhydride, monomethyl maleate, monoethyl maleate, monomethyl fumarate, monoethyl fumarate, tripropylene glycol monomethyl ether acid maleate, or ethylene glycol monophenyl ether acid maleate. The carboxylic acid monomer is preferably selected from $\alpha\beta$-ethylenically unsaturated mono- and polycarboxylic acids and acid anhydrides having from 3 to 8 carbon atoms per molecule and partial esters of such polycarboxylic acid wherein the acid moiety has at least one carboxylic acid group and the alcohol moiety has from 1 to 20 carbon atoms. Such copolymers may consist essentially of ethylene and one or more of such ethylenically unsaturated acid or anhydride comonomers or can also contain small amounts of other monomers copolymerizable with ethylene. Thus, the copolymer can contain other copolymerizable monomers including esters of acrylic acid, methyacrylic acid and the like. Random copolymers of such type and methods of making them are readily known in the art.

Especially preferred ethylene/ethylenically unsaturated carboxylic acid copolymers for use as the metal substrate contacting layer in the present invention are the normally solid random copolymers of ethylene with from about 2 to about 15 weight percent of acrylic, methacrylic or crotonic (especially acrylic acid) such as those described in U.S. Pat. Nos. 3,520,861 and 3,239,370 and the known ionomer salts thereof.

The thickness of the aforementioned ethylene/carboxylic acid copolymer metal-contacting layer employed in the practice of the present invention is not particularly critical. However, as a general rule, each such layer will have a thickness of from about 0.1 to about 5 mils (preferably from 0.2 to about 2.5 mils) and will typically constitute from about 4 to about 96 percent (preferably from about 10 to about 90 percent) of the total thickness of the subject multiple layered thermoplastic adhesive system.

As has been noted, the second required thermoplastic polymer layer employed in the present invention is composed of a blend of (1) a random copolymer of major portion ethylene with a minor proportion of at least one ethylenically unsaturated carboxylic acid monomer and (2) at least one other olefin polymer material which is not a random copolymer of ethylene with an unsaturated carboxylic acid monomer. The ethylene/carboxylic acid copolymer component of such blend layer is generally selected from the same class of normally solid random copolymers as have been hereinbefore described for use in the aforementioned metal-contacting copolymer layer and, in a given instance, such ethylene/carboxylic acid blend layer component can be the same or different from that employed in said metal-contacting layer. As a rule, however, it is generally preferable that the ethylene/carboxylic acid component of said blend layer have a somewhat smaller portion of the ethylenically unsaturated carboxylic acid copolymerized therein than is the case for the ethylene/carboxylic acid copolymer employed in said metal-contacting layer. Thus, for example, when an ethylene/acrylic acid copolymer having an acrylic acid content of 6% by weight of acrylic acid therein is employed in the metal contacting layer, it is generally preferred to use a ethylene/carboxylic acid in the blend layer having a smaller amount of carboxylic acid monomer copolymerized therein such as, for example, an ethylene/acrylic acid copolymer having an acrylic acid content of about 3% or so by weight.

The other olefin polymer material employed in the aforementioned polymer blend layer can suitably be any normally solid olefin polymer which is reasonably compatible with the ethylene/unsaturated carboxylic acid copolymer component of such blend layer and with the olefin polymer layer to which said blend layer is ultimately to be adhered. However, as a general rule it is typically preferred to use an ethylenic olefin polymer such as, for example, the various known ethylene homopolymers (e.g., low, medium and high density polyethylenes), copolymers of a major proportion of ethylene with a minor proportion of known copolymerizable monomers such as higher (e.g., $C_3$ to about $C_{12}$) $\alpha$-olefins, ethylenically unsaturated ester monomers (e.g., vinylacetate, ethyl acrylate, etc.) and graft modified versions of such ethylenic homopolymers and copolymers (e.g., grafted with acrylic acid, maleic anhydride, etc.) as the other olefin polymer component of such polymer blend layer in the practice of the present invention.

The relative proportions of the two required polymer components (i.e., the random ethylene/unsaturated carboxylic acid copolymer and the other olefin polymer material) in the aforementioned polymer blend layer can be varied fairly broadly with the random ethylene/unsaturated carboxylic acid copolymer component generally constituting from about 5 to about 70 weight percent of the subject polymer blend and with said other olefin polymer component generally constituting from about 30 to about 95 weight percent of such polymer blends. Preferably, however, the random ethylene/unsaturated carboxylic acid copolymer is employed in an amount constituting from about 20 to about 70 (especially from about 30 to about 70) weight percent of the polymer blend layer and said other polymer component preferably constitutes from about 30 to about 80 (especially from about 30 to about 70) weight percent of said polymer blend.

The thickness of the indicated polymer blend layer is not particularly critical to the invention. However, as a general rule, such layer will typically constitute from about 4 to about 96 percent of the total thickness of the overall multiple layered thermoplastic adhesive system and will typically have a thickness of from about 0.1 to about 5 mils. Preferably, said polymer blend layer will have a thickness of from about 0.2 to about 2.5 mils and will constitute from about 10 to about 90 percent over the overall multiple layered adhesive system thickness.

With regard to the total thickness of the above-described multiple layered thermoplastic adhesive system, said thickness is typically in the range of from about 0.2 to about 5 mils and is preferably from about 0.2 to about 2.5 mils.

In the practice of the present invention, the above-described multiple layered adhesive film system can be applied to the aforementioned metallic substrate in any convenient fashion which may be desired. Thus, for example, conventional extrusion coating techniques may be employed to apply said multiple layered adhesive to the chosen metallic substrate and, in such event, application can be accomplished either (and more preferably) as a single extrusion coating operation using known coextrusion equipment and techniques or as a multiple step operation in which the various polymer layers to be employed are each individually applied in separate extrusion coating operations. Alternatively, conventional film lamination techniques can also be suitably employed to adhere the noted multiple layered adhesive film system to the desired metallic substrate and, in such event, multiple lamination steps applying the desired individual layers as separate monolayer films can be employed or, more preferably, as a single lamination operation using a previously coextruded film of the desired multilayered adhesive system.

Naturally, a combination of conventional coextrusion and film lamination technologies can be employed to provide the ultimately desired composite articles in a given instance. Thus, for example, when a metal/plastic/metal laminate is to be prepared, it may be desirable to first coextrude a composite film having a structure such as multiple layer adhesive/olefin polymer core/multiple layer adhesive and to thereafter film laminate such composite film to two outer skin layers of the desired metallic sheet material.

Olefin polymer materials to which the polymer blend layer(s) of the above-described multiple layered adhesive film system is ultimately to be adhered in the desired composite article or structure (e.g., as olefin polymer jacketing resins in electrical cable structures, as olefin polymer core layers in metal/plastic/metal laminates and the like) include those hereinbefore described for use as the olefin polymer component in the polymer blend layer of the subject multiple layered adhesive film system. Preferred olefin polymers for such polymer core, jacketing resin etc. usage typically include the various ethylene homopolymers and copolymers of a major proportion of ethylene with a minor proportion of higher (e.g., $C_3$-$C_{12}$) $\alpha$-olefin monomers and vinyl ester monomers such as vinyl acetate and lower alkanol esters of acrylic or methacrylic acid, with the ethylene homopolymers (i.e., low, medium or high density polyethylene) and the ethylene/higher $\alpha$-olefin copolymers being particularly preferred in certain end-use applications.

As has been previously alluded to, the present invention makes possible the preparation of various metal/plastic composite articles or laminates, which are of generally known types (such as, for example, olefin polymer-jacketed electrical or communications cables; structural and/or formable metal/olefin polymer/metal laminates; etc.) but which have improved structural integrity at high and/or low temperatures relative to their known prior art counterparts. Accordingly, with the exception of using the above-described multiple layered thermoplastic adhesive system in the subject laminates or composite articles, the preparation and use thereof in accordance with the present invention are otherwise generally accomplished in the conventional fashion.

The present invention is further illustrated by, but is not to be understood as being in any way limited to, the following detailed examples thereof in which all parts and percentages are on a weight basis unless otherwise indicated.

EXAMPLE 1

In this example, a 2.3 mil thick two layer adhesive film is laminated to one side of a 6 mil thick sheet of electrolytic chrome/chrome oxide coated steel (ECCS) and the resulting ECCS/adhesive film laminate is then compression molded to a 75 mil thick sheet of a telephone cable jacketing resin composition composed of a high molecular weight low density polyethylene having a melt index of 0.45 and a density of 0.932 g/cc and containing 2.6 weight percent carbon black to thereby form an ECCS/2-layer adhesive film/jacketing resin laminate sample. The resulting laminate sample is then cut into 1 inch wide, 3 inch long strips and some of such strips are subjected to 90° peel testing in accordance with ASTM D-1876 (except that a two-inch per minute crosshead speed is employed, conditioning is for 12 to 48 hours in 50% relative humidity air at 73° F., the bonded and unbond lengths of the polymer layer are about 2.5 and 0.5 inches respectively, and testing is performed on at least 3 test specimens instead of ten) at various temperatures in order to determine the initial adhesion values thereof at such testing temperatures. The remaining 1 inch wide sample specimens are immersed (i.e., "aged") in water at 140° F. for one week, allowed to equilibrate and dry in 50% relative humidity, 73° F. air overnight and then are also subjected to 90° peel testing as described above at various temperatures in order to determine the adhesion value for such aged specimens at the indicated testing temperatures. For testing at other than room temperature, the test specimen is placed in the bottom of an environmental chamber for a minimum of 30 minutes at the test temperature to be employed. The test specimen is then placed in the holding fixture and, after re-equilibration for 2 minutes, the peel adhesion is determined.

The two-layer adhesive film employed in the preparation of the aforementioned laminate samples is a 1:1 layer thickness ratio film in which one layer is composed of a random ethylene/acrylic acid (EAA) copolymer (6 weight percent acrylic acid based upon the copolymer weight and melt index=5.5) and in which the other layer is composed of polymer blend of (1) 60 weight percent (based on blend weight) of a conventional low density polyethylene resin having a melt index of 2 and a density of 0.921 g/cc and (2) 40 weight percent (based on the polymer blend weight) of a random ethylene/acrylic acid (EAA) copolymer having an acrylic acid content of 3 weight percent based upon such EAA copolymer and a melt index of 11.0. In the preparation of such samples, the indicated two-layer film is laminated by preheating the metal for one minute in a circulating air oven heated to 300° F. and by then pulling the preheated metal sheet and the indicated two-layer film (the EAA non-blend layer being in direct contact with the metal surface) through a set of rubber nip rolls. The resulting laminate is then post heated for 1 minute in a circulating air oven heated to 300° F.

In the compression molding operation to form the aforementioned ECCS/2-layer adhesive/jacketing resin laminate sample, a platen press is employed, the above-described ECCS/2-layer adhesive film laminate is placed in contact with the indicated jacketing resin sheet in such press (the blend layer of the adhesive film being in direct contact with the jacketing resin sheet) and compresion molding is accomplished at 230° C. and about 15 psig for three minutes. The resulting laminate is then cooled to room temperature in the platen press, removed from the press and subsequently cut into the aforementioned 1 inch wide specimens and tested in the manner hereinbefore indicated.

For comparison purposes, a similar laminate (i.e., Control 1) is prepared and tested in which a single 2.3 mil thick monolayer film composed of the aforementioned 6 weight percent acrylic acid content EAA copolymer only is employed in place of the above-noted two-layer adhesive film system.

The adhesion testing results for each type of laminate are summarized in Table I below.

TABLE I

| | ADHESION AT INDICATED TESTING TEMPERATURE[1] | | | | | | | |
|---|---|---|---|---|---|---|---|---|
| | 10° F. | | Room Temp[2] | | 140° F. | | 160° F. | |
| LAMINATE | Initial | Aged | Initial | Aged | Initial | Aged | Initial | Aged |
| Example 1 | 20.7 | 19.5 | 18.0 | 17.5 | 14.5 | 14.0 | 10.3 | 9.9 |
| Control 1* | 5.2 | 0 | 18.0 | 18.3 | 7.3 | 6.5 | 3.5 | 1.2 |

*Not an example of the invention.
[1]90° peel strength adhesion value in lbs/in of a sample width.
[2]Room Temperature = approximately 73° F.

From the results in Table I, it is seen that while the Control 1 laminate exhibits very good adhesion values at room temperature, such adhesion values are dramatically reduced when measured at the low (i.e., 10° F.) or high (i.e., 140° F. and 160° F.) adhesion testing temperatures. In contrast, even though the adhesion values for the Example 1 laminate are somewhat reduced at the elevated test temperatures (i.e., relative to the room temperature test values), it is nonetheless still seen that the Example 1 laminate exhibits substantially higher low and high temperature adhesion values than those of the Control 1 comparative laminate.

EXAMPLE 2

Example 1 is repeated except that a second jacketing resin composition composed of a high molecular weight low density polyethylene having a melt index of 0.25, a density of 0.932 g/cc and containing 2.6 weight percent carbon black, is employed in place of the jacketing resin composition of Example 1.

In addition, three additional laminates (i.e., Controls 2A, 2B and 2C) are also prepared for comparative purposes using this same second jacketing resin but using a different type of adhesive film in place of the two-layered adhesive film of the Example 2 laminate. Specifically, a 2.3 mil thick monolayer film of the hereinbefore-discussed 6 weight percent acrylic acid (AA) content EAA random copolymer is employed as the adhesive film layer in the Control 2A laminate. In the Control 2B laminate, the adhesive film employed is a 2.3 mil thick 1:1 layer thickness ratio 2-layer film in which the metal contacting layer is composed of the aforementioned 6 weight percent AA content random EAA copolymer and in which the jacketing resin contacting layer is composed of the low density polyethylene resin which was employed as one of the components of the Example 1 and 2 blends layers. In the Control 2C laminate, the adhesive film employed is a 2.3 mil thick 1:1 layer thickness ratio 2-layer film in which the metal contacting layer is once again composed of the aforementioned 6 weight percent AA content random EAA copolymer and in which the jacketing resin contacting layer is composed of the 3 weight percent AA content random EAA copolymer which was employed as one of the components of the Example 1 and 2 blend layers.

The adhesion value results for the Example 2 laminate and for the various comparative laminates are summarized in Table II below.

TABLE II

| | ADHESION AT INDICATED TESTING TEMPERATURE[1] | | | | | | | |
|---|---|---|---|---|---|---|---|---|
| | 10° F. | | Room Temp[2] | | 140° F. | | 160° F. | |
| LAMINATE | Initial | Aged | Initial | Aged | Initial | Aged | Initial | Aged |
| Example 2 | 21.0 | 21.5 | 16.5 | 16.1 | 12.9 | 13.4 | 9.0 | 9.8 |
| Control 2A* | 12.0 | 0 | 18.7 | 16.8 | 5.4 | 9.5 | 2.6 | 5.7 |
| Control 2B* | 12.0 | 9.2 | 15.7 | 17.0 | 8.7 | 10.0 | 6.4 | 7.1 |
| Control 2C* | 12.0 | 14.5 | 16.8 | 18.5 | 9.9 | 10.6 | 3.1 | 3.4 |

*Not an example of the invention.
[1]90° peel strength adhesion value in lbs/in of a sample width.
[2]Room Temperature = approximately 73° F.

As can be seen from the results in Table II, the Example 2 laminate exhibits notably better high (i.e., 140° F. and 160° F.) and low (i.e., 10° F.) temperature values than all three of the comparative laminate samples.

EXAMPLE 3

Example 2 is repeated except that the polymer blend layer of the 2-layer adhesive film system (i.e., the layer ultimately adhered to the jacketing resin sheet) is composed of a blend of (a) 80 weight percent (based on the blend weight) of a low pressure process linear low density polyethylene having a melt index of 1.0 and a density of 0.9219 g/cc with (b) 20 weight percent (based upon the blend) of the 3 weight percent AA content random EAA copolymer component employed in the Example 1 and 2 blend layers.

For comparative purposes, another laminate (Control 3) is prepared in the same fashion except that the jacketing resin contacting layer of the two-layer adhesive film is composed solely of the aforementioned linear low density polyethylene component of the Example 3 blend layer in place of the Example 3 blend layer itself.

The adhesion value results for these two laminate samples are summarized in Table III below.

TABLE III

| LAMINATE | ADHESION AT INDICATED TESTING TEMPERATURE[1] | | | |
|---|---|---|---|---|
| | 10° F. | Room Temp[2] | 140° F. | 160° F. |
| Example 3 | 7.2 | 19.0 | 13.6 | 9.4 |
| Control 3* | 1.0 | 19.2 | 12.8 | 10.2 |

*Not an example of the invention.
[1]Initial 90° peel strength adhesion value in lbs/in of a sample width.
[2]Room Temperature = approximately 73° F.

As can be seen from the results in Table III, the laminate of Example 3 employing the two-layer adhesive film having the indicated polymer blend jacketing contacting layer exhibits notably better 10° F. adhesion than does the Control 3 laminate in which the 3 weight percent AA-containing EAA polymer component is omitted from the jacketing resin contacting layer.

EXAMPLES 4–9

Example 2 is again repeated except that the blend layer of the two layer adhesive film of Example 2 is replaced by a series of different blend layers as indicated in Table IV below.

In addition, another laminate sample (i.e., Control 4) is prepared for comparative purposes in which the non-EAA component of the Example 4–9 blend layers (i.e., conventional low density polyethylene having a melt index of 0.7 and a density of 0.921 g/cc) is used as the sole constituent of a layer used in place of the Example 4–9 blend layers.

The results of the adhesion evaluations for these various laminate samples are summarized in Table IV below. Also presented again in Table IV for comparative purposes are the results for the Control 2A and Control 2C laminates in which the EAA components of the blend layers of Examples 4–6 and 7–9, respectively, are employed as the sole constituent of a non-blend layer used in place of the blend layers of such examples.

TABLE IV

| LAMINATE | BLEND LAYER COMPOSITION | ADHESION AT INDICATED TESTING TEMPERATURE[1] | | | |
|---|---|---|---|---|---|
| | | 10° F. | Room Temp[2] | 140° F. | 160° F. |
| Control 4* | No Blend; 100 wt % Resin A[3] | N.D.[6] | 19.0 | 7.8 | 4.0 |
| Example 4 | 95 wt % Resin A, 5 wt % Resin B[4] | ≃0 | 21.3 | 11.1 | 7.5 |
| Example 5 | 90 wt % Resin A, 10 wt % Resin B | ≃0 | 18.3 | 11.1 | 7.7 |
| Example 6 | 85 wt % Resin A, 15 wt % Resin B | 14.6 | 17.8 | 9.3 | 6.7 |
| Control 2A* | No Blend; 100 wt % Resin B | 12.0 | 18.7 | 5.4 | 2.6 |
| Example 7 | 90 wt % Resin A, 10 wt % Resin C[5] | 13.2 | 18.2 | 12.0 | 8.2 |
| Example 8 | 80 wt % Resin A, 20 wt % Resin C | 9.5 | 17.2 | 12.3 | 9.0 |
| Example 9 | 70 wt % Resin A, 30 wt % Resin C | 13.3 | 18.0 | 12.5 | 7.9 |
| Control 2C* | No Blend; 100 wt % Resin C | 12.0 | 16.8 | 9.9 | 3.1 |

*Not an example of the invention.
[1]Initial 90° peel adhesion value in lbs/in of sample width.
[2]Room Temp ≃ 73° F.
[3]Resin A = Conventional low density polyethylene (melt index = 0.7 and density = 0.921 g/cc)
[4]Resin B = The 6 wt % acrylic acid content EAA resin described in Example 1.
[5]Resin C = The 3 wt % acrylic acid content EAA resin described in Example 1.
[6]N.D. = Adhesion value not determined.

As can be seen from the results in Table IV, the blend layer laminates of Examples 4–9 exhibited better 140° F. and 160° F. adhesion values than is obtained using either of the blend layer components alone. (Compare the 140° F. and 160° F. values for Examples 4–9 with those of Controls 4 and 2A and compare the 140° F. and 160° F. values for Examples 7–9 with those of Controls 4 and 2C.

EXAMPLES 10–15

Example 2 is again repeated except that the blend layer of the two layer adhesive film of Example 2 is replaced by those indicated in Table V below.

In addition, comparative laminate samples (i.e., Controls 5 and 6) are prepared and tested in which a non-blend layer composed solely of the non-EAA component of the Example 10–15 blend layers are employed in place of the blend layers of said examples.

The results of the adhesion evaluations for these various laminates are summarized in Table V below along with a restatement of the results for the Control 2C laminate discussed in Example 2.

TABLE V

| LAMINATE | BLEND LAYER COMPOSITION | ADHESION AT INDICATED TESTING TEMPERATURE[1] | | | |
|---|---|---|---|---|---|
| | | 10° F. | Room Temp[2] | 140° F. | 160° F. |
| Control 5* | No Blend; 100 wt % Resin D[3] | 15.9 | 23.3 | 13.4 | 6.6 |
| Example 10 | 90 wt % Resin D, 10 wt % Resin C[4] | 15.3 | 22.7 | 13.9 | 10.0 |
| Example 11 | 80 wt % Resin D, 20 wt % Resin C | Broke[6] | 21.0 | 13.8 | 9.9 |
| Example 12 | 70 wt % Resin D, 30 wt % Resin C | Broke[6] | 21.3 | 13.1 | 9.5 |
| Control 2C* | No Blend; 100 wt % Resin C | 12.0 | 15.8 | 9.9 | 3.1 |
| Control 6* | No Blend; 100 wt % Resin E[5] | 15.1 | 21.5 | 11.9 | 7.4 |
| Example 13 | 90 wt % Resin E, 10 wt % Resin C | Broke[6] | 17.0 | 12.2 | 8.0 |
| Example 14 | 80 wt % Resin E, 20 wt % Resin C | 12.5 | 17.2 | 11.6 | 8.8 |
| Exampel 15 | 70 wt % Resin E, 30 wt % Resin C | 18.8 | 17.6 | 11.7 | 7.9 |

*Not an example of the invention.
[1]Initial 90° peel adhesion value in lbs/in of sample width.
[2]Room Temp ≃ 73° F.
[3]Resin D is an ethylene/vinyl acetate copolymer having a vinyl acetate content of 12 wt % and a melt index of 0.25.
[4]Resin C is as described in Table IV, footnote 5.
[5]Resin E is a modified olefin polymer resin marketed as PLEXAR ®1 by the Chemplex Company.
[6]"Broke" designates that adhesion was so strong that the peeling tab broke prior to delamination from the metal.

As can be seen from the results in Table V, the 160° F. adhesion values for the blend layer laminates of Examples 10–15 are higher than is obtained using either of the blend layer components along. (Compare 160° F. values for Examples 10–12 relative to those of Controls 5 and 2C and compare the 160° F. values for Examples 13–15 relative to those of Controls 6 and 2C.)

EXAMPLES 16–23

Example 2 is again repeated except that the blend layers of the two layer adhesive films employed are as indicated in Table VI.

In addition, the results for comparative laminate samples are also summarized in Table VI in which non-blend layers are employed in place of the blend layers of the examples, said non-blend layers being composed solely of the individual components of the blend layers of the examples.

TABLE VI

| LAMINATE | BLEND LAYER COMPOSITION | ADHESION AT INDICATED TESTING TEMPERATURE[1] | | | |
|---|---|---|---|---|---|
| | | 10° F. | Room Temp[2] | 140° F. | 160° F. |
| Control 7* | No Blend; 100 wt % Resin F[3] | ~0 | 18.0 | 5.2 | 2.7 |
| Example 16 | 80 wt % Resin F, 20 wt % Resin C[4] | ~0 | 15.7 | 12.0 | 8.5 |
| Example 17 | 60 wt % Resin F, 40 wt % Resin C | Broke | 15.0 | 12.8 | 9.1 |
| Example 18 | 40 wt % Resin F, 60 wt % Resin C | Broke | 15.3 | 10.2 | 3.1 |
| Control 8* | No Blend; 100 wt % Resin G[5] | 12.0 | 15.7 | 8.7 | 6.4 |
| Example 19 | 80 wt % Resin G, 20 wt % Resin C | Broke | 14.3 | 11.3 | 8.6 |
| Example 20 | 40 wt % Resin G, 60 wt % Resin C | Broke | 18.5 | 8.3 | 4.1 |
| Control 9* | No Blend, 100 wt % Resin H[6] | ~0 | 15.0 | 4.9 | 1.3 |
| Example 21 | 80 wt % Resin H, 20 wt % Resin C | ~0 | 14.2 | 10.2 | 7.7 |
| Example 22 | 60 wt % Resin H, 40 wt % Resin C | Broke | 17.0 | 12.9 | 9.2 |
| Example 23 | 40 wt % Resin H, 60 wt % Resin C | 12.0 | 17.8 | 10.0 | 4.4 |
| Control 2C* | No Blend, 100 wt % Resin C | 12.0 | 16.8 | 9.9 | 3.1 |

*Not an example of the invention.
[1]Initial 90° peel adhesion value in lbs/in of sample width.
[2]Room Temp ≈ 73° F.
[3]Resin F = A conventional low density polyethylene (melt index = 1.9 and density = 0.924 g/cc).
[4]Resin C is as indicated in footnote 5 of Table IV.
[5]Resin G = A conventional low density polyethylene (melt index = 2.0 and density = 0.921 g/cc).
[6]Resin H = A conventional low density polyethylene (melt index = 2.7 and density = 0.925 g/cc).

EXAMPLES 24–26

Examples 2, 22 and 17 are repeated except that a low pressure process linear low density polyethylene having a melt index of 0.45 and a density of 0.932 g/cc and containing 2.6 weight percent carbon black is employed as the jacketing resin composition in place of the Example 2 jacketing resin composition.

The adhesion values for the resulting laminate samples are summarized in Table VII below.

TABLE VII

| LAMINATE | BLEND LAYER COMPOSITION | ADHESION AT INDICATED TESTING TEMPERATURE[1] | | | |
|---|---|---|---|---|---|
| | | 10° F. | Room Temp[2] | 140° F. | 160° F. |
| Example 24 | 60 wt % Resin G[3], 40 wt % Resin C | 20.7 | 18.0 | 14.5 | 10.3 |
| Example 25 | 60 wt % Resin H[4], 40 wt % Resin C | 20.8 | 18.3 | 14.3 | 10.8 |
| Example 26 | 60 wt % Resin F[5], 40 wt % Resin C | 16.3 | 20.5 | 13.8 | 9.0 |

[1]Initial 90° peel adhesion value in lbs/in of sample width.
[2]Room Temp ≈ 73° F.
[3]Resin G is as described in Table VI, footnote 5.
[4]Resin H is as described in Table VI, footnote 6.
[5]Resin F is as described in Table VI, footnote 3.

As can be seen from the results in Table VII, the laminates of Examples 24–26 exhibited very good adhesion across the full range of testing temperatures.

While the present invention has been herein illustrated by reference to particular embodiments and examples thereof, such fact is not to be understood as in any way limiting the scope of the instantly claimed invention.

What is claimed is:

1. A plastic/metal laminate comprising at least one metallic substrate having directly adhered to at least one surface thereof a multi-layered plastic coating consisting essentially of a first thermoplastic polymer layer of a random copolymer of ethylene with an ethylenically unsaturated carboxylic acid monomer, said first layer being directly adhered to said metallic substrate, and a second thermoplastic polymer layer which consists essentially of a polymer blend of a random copolymer of ethylene with an ethylenically unsaturated carboxylic acid and at least one ethylenic polymer resin which is not a random copolymer of ethylene with an ethylenically unsaturated carboxylic acid monomer and which is directly adhered to said first polymer layer on the surface thereof opposite said metallic substrate; said blend layer being further characterized by being capable, when employed as an intermediate adhesive layer between said first polymer layer and an olefin polymer layer composed of an olefin polymer resin selected from the group consisting of ethylene homopolymers and copolymers of a major proportion of ethylene with a minor proportion of a comonomer which is polymerizable therewith, of providing higher 90° peel adhesion as between said first polymer layer and said olefin polymer layer when measured at 10° F. or 160° F. than is obtained by directly adhering said first polymer and said olefin polymer layer to each other.

2. The plastic/metal laminate of claim 1, wherein the metallic substrate is steel, aluminum or copper.

3. The plastic/metal laminate of claim 2, wherein the metallic substrate has a thickness of from about 2 to about 25 mils.

4. The plastic/metal laminate of claim 2 wherein the metallic substrate has a thickness of from about 4 to about 15 mils.

5. The plastic/metal laminate of claim 1, wherein the random copolymer of ethylene with the ethylenically unsaturated carboxylic acid in the first thermoplastic polymer layer has from about 1 to about 30 weight percent of said unsaturated carboxylic acid copolymerized therein.

6. The plastic/metal laminate of claim 5, wherein in the second thermoplastic polymer layer, the copolymer of ethylene with the ethylenically unsaturated carboxylic acid in the polymer blend has from about 1 to about 30 weight percent of said unsaturated carboxylic acid copolymerized therein and wherein the other olefin polymer component of said polymer blend is selected from the group consisting of low density polyethylene, copolymers of ethylene with a minor proportion of $C_4$ to about $C_{12}$ α-olefins and ethylenic olefin polymers graft copolymerized with ethylenically unsaturated carboxylic acids or anhydrides.

7. The plastic/metal laminate of claim 1 wherein, in the polymer blend of the second thermoplastic polymer layer, the different olefin polymer resin is low, medium or high density polyethylene.

8. The plastic/metal laminate of claim 1 wherein, in the polymer blend of the second thermoplastic polymer layer, the different olefin polymer is a copolymer of a major proportion of ethylene with a minor proportion of an ethylenically unsaturated ester monomer.

9. The plastic/metal laminate of claim 1 wherein, in the polymer blend of the second thermoplastic polymer layer, the different olefin polymer is an acrylic acid or maleic anhydride graft modified homopolymer of ethylene or copolymer of a major proportion thereof with a minor proportion of a monomer which is copolymerizable therewith.

10. The plastic/metal laminate of claim 1 wherein the surface of the metallic substrate opposite said multi-layered plastic coating has adhered directly thereto a single layer coating of a random copolymer of ethylene with a minor proportion of an ethylenically unsaturated carboxylic acid.

11. The plastic/metal laminate of claim 10 wherein the multiple-layered plastic coating and the single layer coating each have a thickness in the range of from about 0.1 to about 5 mils.

12. An electrical cable having improved high and/or low temperature structural integrity comprising (1) a core including at least one insulated conductor; (2) a shield or armor surrounding said core, the shield comprising a plastic/metal laminate which comprises (a) at least one metallic substrate having directly adhered to at least one surface thereof (b) a multi-layered plastic coating consisting essentially of (i) a first thermoplastic polymer layer of a random copolymer of ethylene with an ethylenically unsaturated carboxylic acid monomer, said first layer being directly adhered to said metallic substrate, and (ii) a second thermoplastic polymer layer which consists essentially of a polymer blend of a random copolymer of ethylene with an ethylenically unsaturated carboxylic acid monomer and at least one ethylenic polymer resin which is not a random copolymer of ethylene with an ethylenically unsaturated carboxylic acid monomer and which is directly adhered to said first polymer layer on the surface thereof opposite said metallic substrate, and (c) a single layer coating of a random copolymer of ethylene with a minor proportion of an ethylenically unsaturated carboxylic acid, the single layer coating being directly adhered to a surface of the metallic substrate opposite that surface to which a multilayered plastic coating is directly adhered; and (3) an outer olefin polymer jacket surround said shield and being directly adhered to the second thermoplastic polymer layer of said shield.

13. The plastic/metal laminate of claim 1 in the form of a cable shielding tape.

14. A metal/plastic/metal laminate comprising two metallic substrates sandwiching an inner olefin polymer core layer and having interposed between each of the two major surfaces of said core layer and its adjacent metallic substrate a multiple layered thermoplastic adhesive system comprising (a) a first thermoplastic polymer layer of a random copolymer of ethylene with an ethylenically unsaturated carboxylic acid monomer, said first polymer layer being directly adhered to said metal substrate and (b) a second thermoplastic polymer layer which is directly adhered to said first thermoplastic polymer layer and to one surface of said core layer and which comprises a blend of (1) a random copolymer of ethylene with an ethylenically unsaturated carboxylic acid monomer and (2) at least one olefin polymer resin which is not a random copolymer of ethylene with an ethylenically unsaturated carboxylic acid monomer.

15. The metal/plastic/metal laminate of claim 14 wherein at least one of the metal substrates is aluminum.

16. The metal/plastic/metal laminate of claim 14 wherein at least one of the metal substrates is steel.

17. The metal/plastic/metal laminate of claim 14 wherein the olefin polymer core layer is low, medium, or high density polyethylene.

18. A cable shielding or armoring tape consisting essentially of a metallic substrate having two major planar surfaces and having adhered directly to one of said major planar surfaces a multi-layered plastic coating consisting essentially of (a) a first thermoplastic polymer layer which is composed essentially of a random copolymer of ethylene with an ethylenically unsaturated carboxylic acid monomer and which is directly adhered to said metallic substrate and (b) a second thermoplastic polymer layer which is directly adhered to said first polymer layer, on the surface of said polymer layer opposite said metallic substrate, and which consists essentially of a blend of (1) a random copolymer of ethylene with an ethylenically unsaturated carboxylic acid monomer and (2) at least one ethylenic olefin polymer which is not a random copolymer of ethylene with an ethylenically unsaturated carboxylic acid monomer.

19. A cable shielding or armoring tape according to claim 18 which further comprises a second plastic coating which is adhered to the remaining major planar surface of said metallic substrate.

20. The cable shielding or armoring tape of claim 19 wherein said second plastic coating comprises at least one layer of a random copolymer of ethylene with an ethylenically unsaturated carboxylic acid copolymer.

* * * * *

UNITED STATES PATENT AND TRADEMARK OFFICE
CERTIFICATE OF CORRECTION

PATENT NO. : 4,449,014
DATED : May 15, 1984
INVENTOR(S) : Richard H. Brezinsky

It is certified that error appears in the above—identified patent and that said Letters Patent is hereby corrected as shown below:

Col. 1, line 13, insert after "aspect to" --plastic/metal laminated comprising at least one metallic substrate having at least one layer of a thermoplastic polymer directly adhered to at least one surface thereof. In another, more particular aspect, this invention relates (I) to such laminates--.

Col.1, line 45, insert after "a first film" --layer of an ethylene/acrylic or methacrylic acid copolymer or known ionomer salts thereof and (2) a second film layer of either polyethylene, an ethylene/acrylyl ester copolymer or an ethylene/ vinyl acetate copolymer.
While it appears--.

Col. 1, line 58, "methyacrylic" should read --methacrylic--.

Col. 1, line 60, "often times" should read --oftentimes--.

Col. 4, line 17, "Similarily" should read --Similarly--.

Col. 5, line 28, "αβ-ethylenically" should read --α,β-ethylenically--.

Col. 5, line 40, "methyacrylic" should read --methacrylic--.

UNITED STATES PATENT AND TRADEMARK OFFICE
CERTIFICATE OF CORRECTION

PATENT NO. : 4,449,014
DATED : May 15, 1984
INVENTOR(S) : Richard H. Brezinsky

It is certified that error appears in the above—identified patent and that said Letters Patent is hereby corrected as shown below:

Col. 8, line 29, "unbond" should read --unbonded--.

Col. 9, line 8, "compresion" should read --compression--.

Col. 9, line 54 should read --the Control 1 comparative laminate.--

Col. 9, line 55, should read --EXAMPLE 2-- centered.

Col. 12, TABLE V, "Exampel 15" should read --Example 15--.

Col. 16, line 8, "surround" should read --surrounding--.

Signed and Sealed this

Eighteenth Day of December 1984

[SEAL]

Attest:

GERALD J. MOSSINGHOFF

Attesting Officer    Commissioner of Patents and Trademarks